US007098728B1

(12) United States Patent
Mei et al.

(10) Patent No.: US 7,098,728 B1
(45) Date of Patent: Aug. 29, 2006

(54) OUTPUT VOLTAGE CORRECTION CIRCUIT FOR MULTIPLEXED MULTI-PHASE HYSTERETIC VOLTAGE REGULATOR

(75) Inventors: Tawen Mei, Mountain View, CA (US); Chunping Song, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 101 days.

(21) Appl. No.: 10/915,816

(22) Filed: Aug. 11, 2004

(51) Int. Cl.
*G05F 1/10* (2006.01)
*G05F 3/02* (2006.01)
(52) U.S. Cl. .................. 327/538; 323/283; 323/272
(58) Field of Classification Search ................ 327/538
See application file for complete search history.

(56) References Cited

U.S. PATENT DOCUMENTS 6,853,169 B1 * 2/2005 Burstein et al. ............ 323/272

OTHER PUBLICATIONS

Gu et al, "A Multphase DC/DC Converter with Hysteretic Voltage Control and Current Sharing," IEEE, APEC 2002, pp. 670-674.

* cited by examiner

*Primary Examiner*—Quan Tra
(74) *Attorney, Agent, or Firm*—Darby & Darby PC; John W. Branch

(57) ABSTRACT

A method and circuit for compensating offset error caused by multiplexing in hysteretic control loops. An offset voltage, caused by one phase descending without being hysteretically controlled while another phase is being controlled, is determined by a sample-and-hold circuit that is arranged to track a low limit voltage $V_{lo}$ and a lowest voltage $V_{valley}$. The offset voltage is one half of a difference between $V_{lo}$ and $V_{valley}$. A timing and control circuit provides timing control voltages to the sample-and-hold circuit based on input signals associated with phase 1 and phase 2. The sample-and-hold circuit provides $V_{lo}$ and $V_{valley}$ to a differential amplifier that is arranged to provide the offset voltage to a hysteretic controller circuit. In one embodiment, the offset voltage is added to a reference voltage for corrected output voltage. In another embodiment, the offset voltage is added to the output voltage.

20 Claims, 5 Drawing Sheets

OUTPUT VOLTAGE CORRECTION CIRCUIT FOR MULTIPLEXED MULTI-PHASE HYSTERETIC VOLTAGE REGULATOR

FIELD OF THE INVENTION

The present invention relates to power supplies and more specifically DC—DC converters including multiphase hysteretic control with improved offset.

BACKGROUND

To satisfy power supply and dynamic requirements of today's microprocessors and related communication systems, many approaches have been implemented. Single-phase voltage-mode hysteretic control, also called "bang—bang" control or ripple regulator control, typically maintains an output voltage within a hysteresis band centered about an internal reference voltage. If the output voltage reaches or exceeds the reference voltage plus one-half of the hysteresis band, the controller turns OFF the high-side switch, which can be a Metal-Oxide Semiconductor Field-Effect Transistor (MOSFET), and turns ON the low-side switch, to block energy from being transferred from an input to an output. This latter condition is a power stage OFF-state, and causes the output voltage to decrease.

When the output voltage is at or below the level of the reference minus one-half of the hysteresis band, the power stage goes into ON-stage, and the controller turns ON the high-side switch, and turns OFF the low-side switch to allow energy transfer from the input to the output, which causes the output voltage to increase. This hysteretic method of control keeps the output voltage within the hysteresis band around the reference voltage. Thus, an output voltage of one volt is generally corrected from a deviation as small as a few millivolts as quickly as an output filter allows.

In an ideal hysteretic control circuit, an output voltage is typically regulated into a hysteresis band and a DC value of the output voltage is equal to a reference voltage, hence there is no DC error. A significant benefit of hysteretic control is its fast response. If an output-load current step or an input-voltage transient forces the output voltage out of the hysteresis band, the control circuit may set a power-stage MOSFET in a continuous on or off state as required to return the output voltage back to the hysteresis band. Thus, the output voltage may be corrected as quickly as an output filter allows. Generally, there are no delays from an error amplifier and its associated feedback loop as there are in voltage- and current-mode controllers. Other advantages of hysteretic control include no feedback-loop compensation and no input filter interaction problems. Thus, hysteretic control is a relatively inexpensive and simple regulation architecture.

Commonly used hysteretic control circuits have poor regulation accuracy, however. Typically inaccuracies up to 30 mV are not uncommon. For applications such as microprocessors, where accuracies exceeding 20 mV may not be acceptable, poor regulation accuracy of a hysteretic control circuit may make it undesirable although its fast response and robustness may make it attractive. To overcome the propagation delay's influence and to improve hysteretic control circuit's accuracy, typically circuits may be over-designed, resulting in increased cost and sacrificed performance.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a method and circuit for compensating offset error caused by multiplexing in hysteretic control loops. An offset voltage $V_{offset}$, caused by one phase descending without being hysteretically controlled while another phase is being controlled, is determined by a sample-and-hold circuit that is arranged to track a low limit voltage $V_{lo}$ and a lowest voltage $V_{valley}$. $V_{offset}$ is one half of a difference between $V_{lo}$ and $V_{valley}$. A timing logic circuit provides timing control voltages to the sample-and-hold circuit based on logic input signals associated with phase 1 and phase 2. The sample-and-hold circuit provides $V_{lo}$ and $V_{valley}$ to a differential amplifier that is arranged to provide the offset voltage $V_{offset}$ to a hysteretic controller circuit. In one embodiment, the offset voltage is added to a reference voltage $V_{ref}$ for corrected output voltage. In another embodiment, the offset voltage is added to the output voltage.

While a preferred embodiment of the present invention may be implemented in a two-phase hysteretic voltage regulator circuit, the invention is not so limited. The described circuit may be employed as part of virtually any multi-phase hysteretic control circuit known to those skilled in the art.

Figure 1:
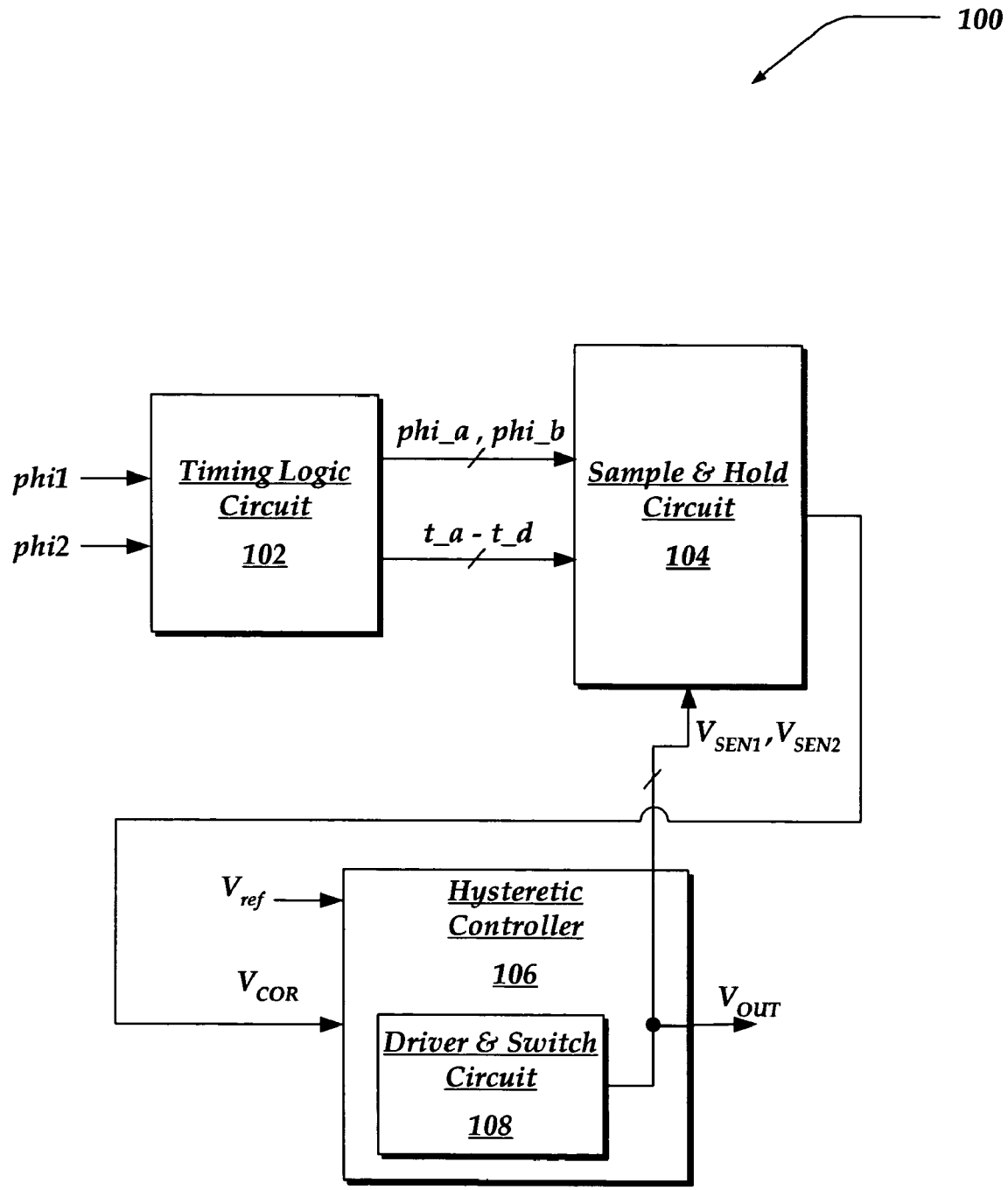
FIG. 1 illustrates a block diagram of an embodiment of a hysteretic voltage regulator circuit according to the present invention.

FIG. 1 illustrates a block diagram of an embodiment of a hysteretic voltage regulator circuit 100. Hysteretic voltage regulator circuit 100 includes timing logic circuit 102, sample-and-hold circuit 104, hysteretic controller 106, driver-and-switch circuit 108. Hysteretic voltage regulator circuit 100 is arranged to compensate for an offset error caused by multiplexing in a multiphase hysteretic voltage regulator.

Increases in an amount of current and demand for faster response time by typical loads for hysteretic voltage regulators, such as microprocessors, and the like, have lead to higher switching frequencies. A higher switching frequency provides faster transient response and smaller converter size (high power density) because of the reduction in the magnetic components size and filter. In a single module, however, the switching frequency could reach such a large and impractical value that switching losses may lead to a reduced overall efficiency and provoke excessive heat.

In response to the foregoing, a multiphase (interleave) technique provides for connecting multiple hysteretic converters in parallel with phase shift of their control signals so that an output current ripple is naturally cancelled while achieving fast response. An inductor current of the interleaved phases is typically added together in a lower ripple output current. This results in a switching frequency for each module that is lower than an output voltage ripple frequency. Accordingly, a higher output voltage ripple frequency can be achieved as the number of interleaved phases increases. Moreover, an effective output inductance is reduced because of the parallel configuration and the transient response is improved. By increasing the number of paralleled phases, higher current capability may be achieved. Thermal problems may also be easier to handle in a multiphase converter.

Timing logic circuit 102 is arranged to receive logic input signals phi1 and phi2. In one embodiment, phi2 and phi2 may be logic signals associated with a first phase and a second phase of the multiphase hysteretic voltage regulator. Timing logic circuit 102 is further arranged to provide timing control voltages phi_a, phi_b, t_a, t_b, t_c, and t_d based on phi1 and phi2 such that modules of sample-and-hold circuit 104 are enabled to sample multiplexed voltages $V_{SEN1}$ and $V_{SEN2}$. Timing control voltages phi_a, phi_b, t_a, t_b, t_c, and t_d may be employed as gate voltages for transistors included in the modules of sample-and-hold circuit 104.

In another embodiment, hysteretic voltage regulator circuit 100 may include more than two phases. In that case additional input signals associated with the phases such as phi3, phi4, and the like, may be employed.

Sample-and-hold circuit 104 is arranged to receive multiplexed voltages $V_{SEN1}$ and $V_{SEN2}$ from hysteretic controller 106 and provide correction voltage $V_{COR}$ to the hysteretic controller in response to $V_{SEN1}$, $V_{SEN2}$, timing control voltages phi_a, phi_b, t_a, t_b, t_c, and t_d from timing logic circuit 102. In one embodiment, sample-and-hold circuit 104 includes three sample-and-hold modules. A first module is arranged to sample $V_{SEN1}$ and $V_{SEN2}$, and to provide a low limit voltage $V_{lo}$. A second module is arranged to sample $V_{SEN2}$. A third module is arranged to sample $V_{SEN1}$. Output voltages of the second and the third modules may be combined to provide a lowest voltage $V_{valley}$ of the hysteretic controller. $V_{lo}$ and $V_{valley}$ may then be provided to a differential amplifier, which is arranged to determine $V_{COR}$ based on a difference between $V_{lo}$ and $V_{valley}$.

Hysteretic controller 106 is arranged to provide regulated output voltage $V_{OUT}$ based, in part, on a reference voltage $V_{ref}$ and correction voltage $V_{COR}$. $V_{COR}$ provides correction for an offset of output voltage $V_{OUT}$ due to multiplexing. Hysteretic controller 106 is further arranged to provide $V_{SEN1}$ and $V_{SEN2}$ to sample-and-hold circuit 104 for determination of $V_{COR}$. $V_{SEN1}$ and $V_{SEN2}$ are voltages before an RC filter stage at an output of hysteretic controller 106.

FIG. 1 shows a particular arrangement of inputs and outputs of the various components. In one embodiment, all of the components of hysteretic voltage regulator circuit 100 may be included in the same chip. Alternatively, one or more of the components may be off-chip.

Figure 2:
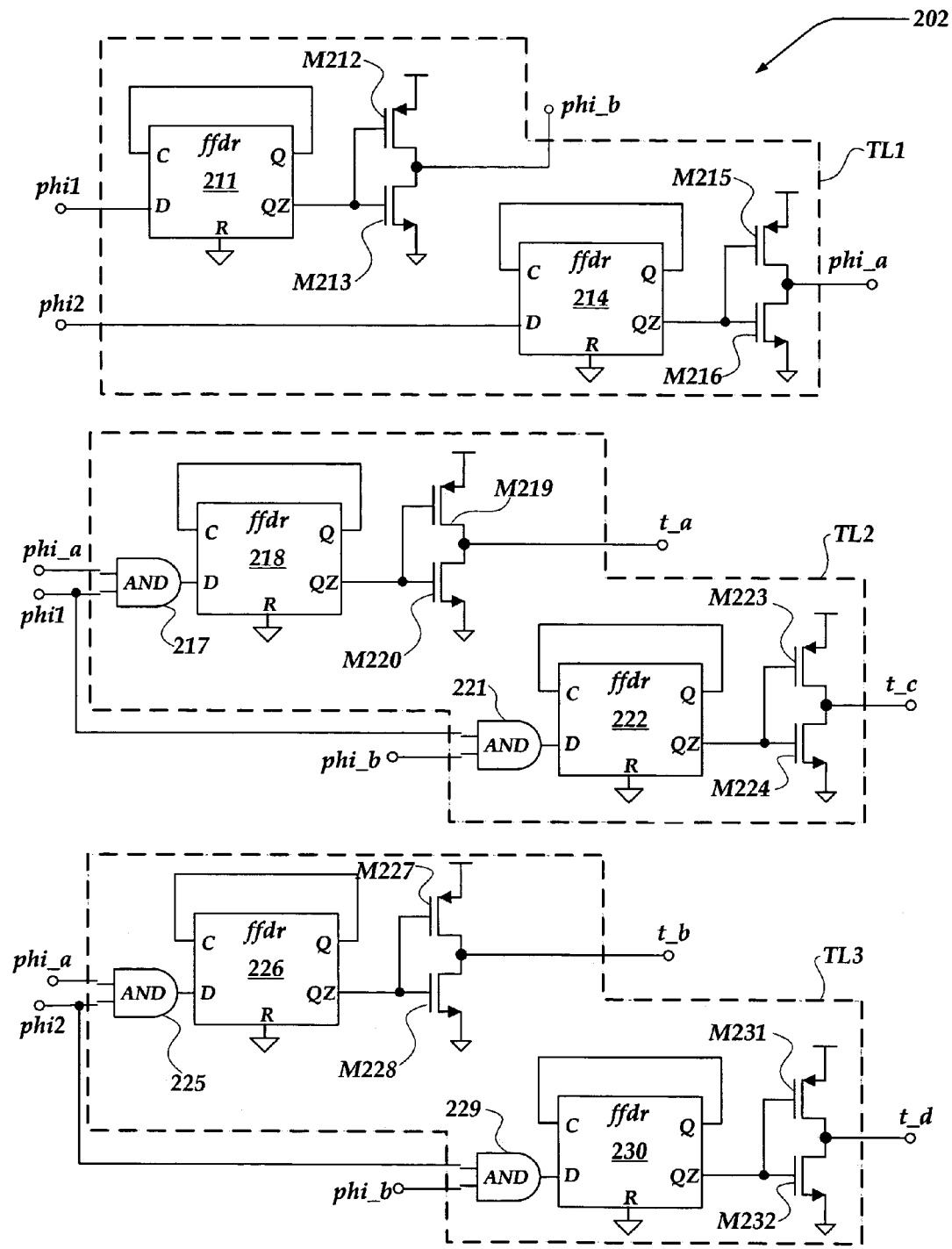
FIG. 2 schematically illustrates an embodiment of a timing logic circuit of FIG. 1.

FIG. 2 schematically illustrates an embodiment of timing logic circuit 202, which may be implemented in hysteretic voltage regulator circuit 100 of FIG. 1. Timing logic circuit 202 is arranged to receive logic input signals phi1 and phi2, and to provide timing control voltages phi_a, phi_b, t_a, t_b, t_c, and t_d based on phi1 and phi2 such that modules of sample-and-hold circuit 104 of FIG. 1 are turned on and off to sample multiplexed voltages $V_{SEN1}$ and $V_{SEN2}$. Timing logic circuit 202 includes timing modules TL1, TL2, and TL3.

Timing module TL1 includes flip flops 211 and 214, and transistors M212, M213, M215, and M216. An output of flip flop 211 is coupled to a gate of M212 and a gate of M213. Transistors M212 and M213 are coupled in series, wherein a source of M212 is coupled to a supply voltage and a drain of M213 is coupled to a ground. Flip flop 211 and transistors M212, M213 are arranged to receive logic input signal phi1 that is associated with phase 1 of the hysteretic voltage regulator and provide timing control voltage phi_b. An output of flip flop 214 is coupled to a gate of M215 and a gate of M216. Transistors M215 and M216 are coupled in series, wherein a source of M215 is coupled to a supply voltage and a drain of M216 is coupled to a ground. Flip flop 212 and transistors M215, M216 are arranged to receive logic input signal phi2 that is associated with phase 2 of the hysteretic voltage regulator and provide timing control voltage phi_a.

Phi_a and phi_b are provided to sample-and-hold circuit to control sampling and holding times of the first sample-and-hold module such that low limit voltage $V_{lo}$ is determined from $V_{SEN1}$ and $V_{SEN2}$. Phi_a and phi_b are further provided to timing modules TL2 and TL3.

Timing module TL2 is structured similarly to timing module TL1. TL2 includes flip flops 218 and 222, and transistors M219, M220, M223, and M224. TL2 includes, additionally, logic AND operators 217 and 221. Logic AND operator 217 is arranged to receive logic input signal phi1 and timing control voltage phi_a, and to provide an input to flip flop 218 based on an AND operation between phi1 and phi_a. Flip flop 218 and transistors M219, M220 are arranged to provide timing control voltage t_a, similar to flip flop 211 and transistors M212, M213 of TL1.

AND operator 221, flip flop 222, and transistors M223, M224 are arranged to receive phi1 and phi_b, and to provide timing control voltage t_c operating similarly to AND operator 217, flip flop 218, and transistors M219, M220.

Timing module TL3 is structured and operates substantially similarly to timing module TL2. TL3 includes flip flops 226 and 230, transistors M227, M228, M231, M232, and logic AND operators 225 and 229. AND operator 225, flip flop 226, and transistors M227, M228 are arranged to receive phi2 and phi_a, and to provide timing control voltage t_b. AND operator 229, flip flop 230, and transistors M231, M232 are arranged to receive phi2 and phi_b, and to provide timing control voltage t_d.

In one embodiment, flip flops 211, 214, 218, 222, 226, and 230 may include a D flip flop, a JK flip flop, and the like.

Figure 3:
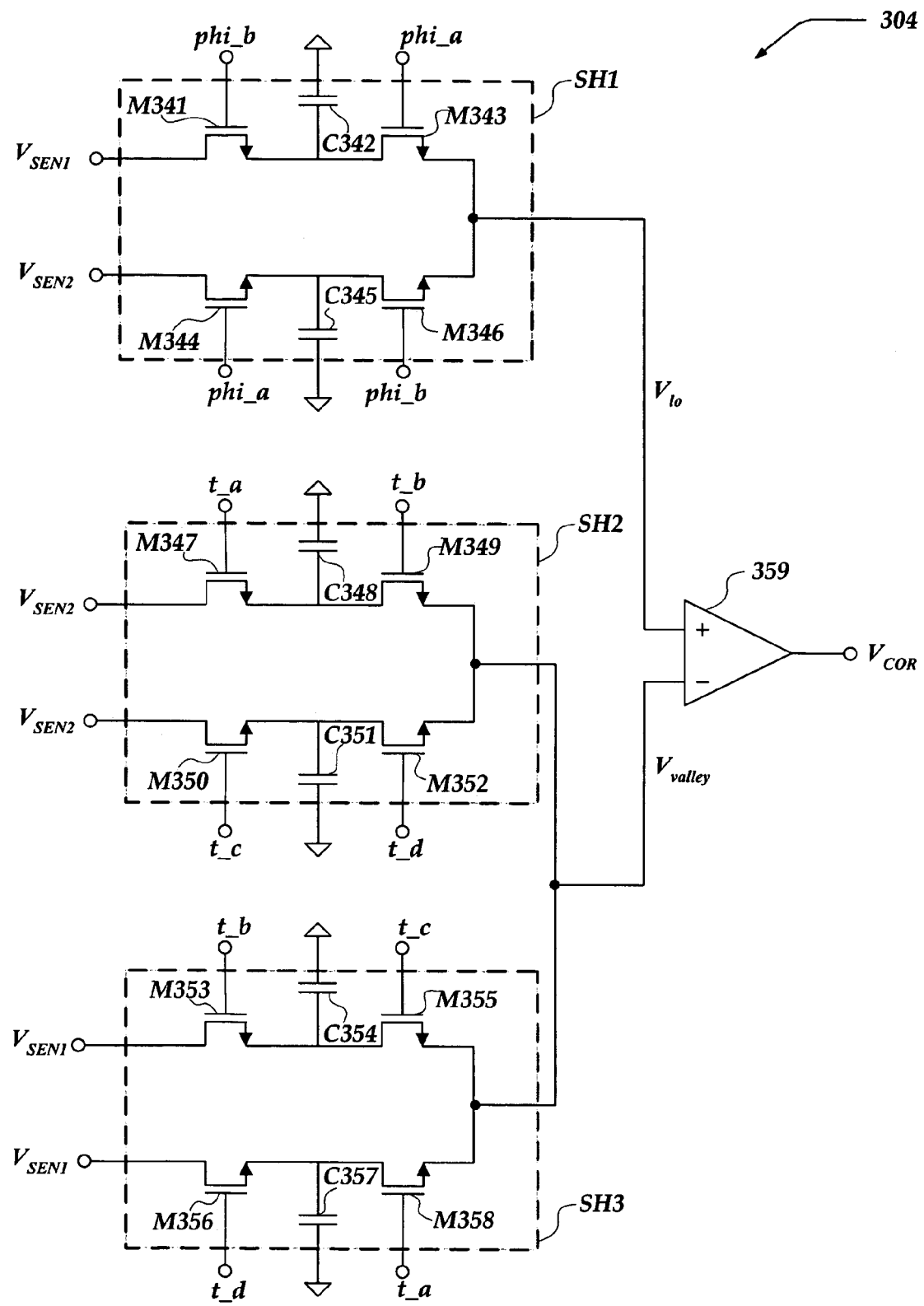
FIG. 3 schematically illustrates an embodiment of a sample-and-hold circuit of FIG. 1.

FIG. 3 schematically illustrates an embodiment of sample-and-hold circuit 304 that may be implemented in hysteretic voltage regulator circuit 100 of FIG. 1. Sample-and-hold circuit 304 is arranged to receive multiplexed voltages $V_{SEN1}$ and $V_{SEN2}$ from hysteretic controller 106 of FIG. 1, and to provide correction voltage $V_{COR}$ to the hysteretic controller in response to $V_{SEN1}$, $V_{SEN2}$, timing control voltages phi_a, phi_b, t_a, t_b, t_c, and t_d from timing logic circuit 102 of FIG. 1. Sample-and-hold circuit 304 includes sample-and-hold modules SH1, SH2, SH3, and differential amplifier 359.

Sample-and-hold module SH1 is arranged to sample $V_{SEN1}$ and $V_{SEN2}$, and to provide a low limit voltage $V_{lo}$ to differential amplifier 359. SH1 includes transistors M341, M343, M344, M346, and holding capacitors C342 and C345. Transistor M341 is arranged to receive the multiplexed voltage $V_{SEN1}$ and provide it to holding capacitor C342. Transistor M341 is controlled by timing control voltage phi_b that is provided to its gate. A terminal of holding capacitor C342 is coupled between a drain of M341 and a source of M343. Another terminal of holding capacitor C342 is coupled to a ground. Holding capacitor 342 is arranged to hold the sampled voltage until M343 conducts and forwards the sampled voltage to differential amplifier 329 based on timing control voltage phi_a.

The second part of sample-and-hold module SH1 comprising transistors M344, M346, and holding capacitor C345 is arranged to sample $V_{SEN2}$ operating substantially similarly to the first part described above. The timing control voltages phi_a and phi_b are provided to the gates of M344 and M346, respectively, to control a turning on and off of the transistors. A drain of transistor M343 and a drain of M346 are coupled together such that the sampled voltages are provided to differential amplifier 359 based on phi_a and phi_b, depending on when each timing voltage turns on the corresponding transistor. SH1 provides low limit voltage $V_{lo}$ of the hysteretic controller to differential amplifier 359 based on sampling $V_{SEN1}$ and $V_{SEN2}$ in both phases.

Second and third sample-and-hold modules SH2 and SH3 are structured virtually identical to SH1. SH2 includes transistors M347, M349, M350, M352, and holding capacitors C348 and C351. SH3 includes transistors M353, M355, M356, M358, and holding capacitors C354 and C357.

SH2 is arranged to sample $V_{SEN2}$ based on timing control voltage pairs t_a, t_b, and t_c, t_d. SH3 is arranged to sample $V_{SEN1}$ based on timing control voltage pairs t_b, t_c, and t_d, t_a. Essentially SH2 and SH3 take turns in sampling the multiplexed voltages in each phase and determining a lowest voltage $V_{valley}$ of the hysteretic controller.

The timing control voltages in each of the sample-and-hold modules are arranged to activate the transistors such that one holding capacitor tracks the sampled voltage while the other capacitor holds the sampled voltage.

$V_{lo}$ and $V_{valley}$ are provided by the sample-and-hold modules to differential amplifier 359 as described above. Differential amplifier 359 is arranged to provide correction voltage $V_{COR}$ to hysteretic controller based on a difference between V1, and $V_{valley}$. In one embodiment, $V_{COR}$ may be expressed as:

$$V_{COR} = \frac{1}{2}(V_{lo} - V_{valley}),$$

where a gain of differential amplifier 359 is arranged to be substantially one half. In another embodiment, more than two phases may be employed in the multiplexed hysteretic voltage regulator circuit, and the gain of differential amplifier 359 may be preselected differently.

Figure 4:
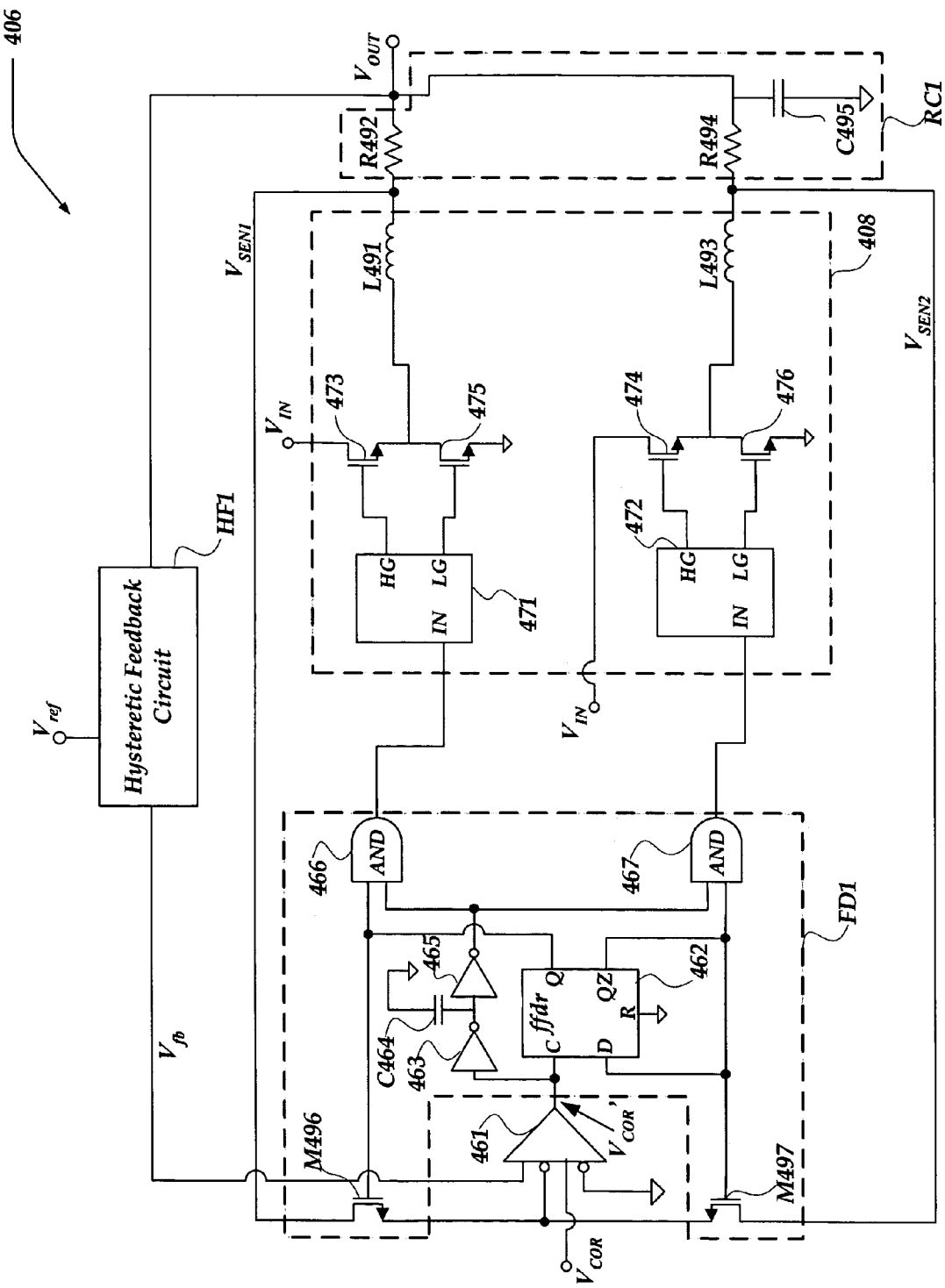
FIG. 4 schematically illustrates an embodiment of a hysteretic controller circuit of FIG. 1.

FIG. 4 schematically illustrates an embodiment of hysteretic controller 406, which may be implemented in hysteretic voltage regulator circuit 100 of FIG. 1. Hysteretic controller 406 is arranged to provide a corrected output voltage $V_{OUT}$ such that an offset component of $V_{OUT}$ caused by multiplexing is substantially reduced. Hysteretic controller 406 includes comparator 461, frequency divider FD1, dual phase drivers 408, output RC filter RC1, and hysteretic feedback circuit HF1.

Comparator 461 is arranged to receive $V_{COR}$ from sample-and-hold circuit, hysteretic feedback voltage $V_{fb}$ from hysteretic feedback circuit HF1, and one of multiplexed voltages $V_{SEN1}$ and $V_{SEN2}$. Comparator 461 provides corrected voltage $V_{COR}'$ to frequency divider FD1, which in turn drives dual phase drivers 408.

Compensation for offset error due to multiplexing may be accomplished by adding a correction voltage to output voltage $V_{OUT}$, by adding the correction voltage to reference voltage $V_{ref}$, and the like. According to one embodiment of the present invention, hysteretic feedback circuit HF1 is arranged to receive $V_{ref}$ and $V_{OUT}$, and to provide $$V_{fb} = \frac{1}{2}(V_{ref} + V_{OUT})$$

to comparator 461. Accordingly, correction voltage $V_{COR}$ is added to $V_{ref}$, $V_{OUT}$, or both. A corrected voltage $V_{COR}'$ at the output of comparator 461 may be expressed as:

$$V_{COR}' = \frac{1}{2}(V_{ref} + V_{OUT} + V_{lo} - V_{valley}).$$

Frequency divider FD1 is arranged to receive corrected voltage $V_{COR}'$ from comparator 461 and drive dual phase drivers 408. FD1 includes flip flop 462, inverters 463 and 465, capacitor C464, AND operators 466 and 467, and switch transistors M496 and M497. $V_{COR}'$ is provided to an input of flip flop 462. An output of flip flop 462 is arranged to drive an input of AND operator 466 and to control switch transistor M496 such that $V_{SEN1}$ is provided to an input of comparator 461 based on the output of flip flop 462. An inverted output of flip flop 462 is arranged to drive an input of AND operator 467 and to control switch transistor M497 such that $V_{SEN2}$ is provided to the input of comparator 461 based on the inverted output of flip flop 462.

AND operators 466 and 467 are arranged to receive $V_{COR}'$ as another input signal and to provide an input voltage to dual phase drivers 408 based on each phase of the multiplexed operation.

Dual phase drivers 408 include two virtually identical step-down-switch-mode power supply (SMPW) driver circuits. In a further embodiment, where more than two phases may be employed for multiplexing, more than two driver circuits may be implemented. The first driver circuit comprises driver 471 and switching transistors 473 and 475. The second driver circuit comprises driver 472 and switching transistors 474 and 476. In one embodiment, input voltage $V_{IN}$ may be provided to a source of switching transistor 473 and 474 as well. A node, where a drain of switching transistor 473 and a source of transistor 475 are coupled, is further coupled to inductor L491 of the output filter. Similarly, a node, where a drain of switching transistor 474 and a source of transistor 476 are coupled, is further coupled to inductor L493 of the output filter. The first driver circuit is arranged to provide V$_{SEN1}$ to output RC filter circuit RC1 as well as to frequency divider FD1, and sample-and-hold circuit. The second driver circuit is arranged to provide V$_{SEN2}$ to output RC filter circuit RC1 as well as to frequency divider FD1, and sample-and-hold circuit.

Output RC filter circuit RC1 includes resistors R492, R494, and capacitor C495. RC1 is arranged to receive V$_{SEN1}$ and V$_{SEN2}$, and to provide offset corrected output voltage V$_{OUT}$, which is hysteretically regulated.

Figure 5:
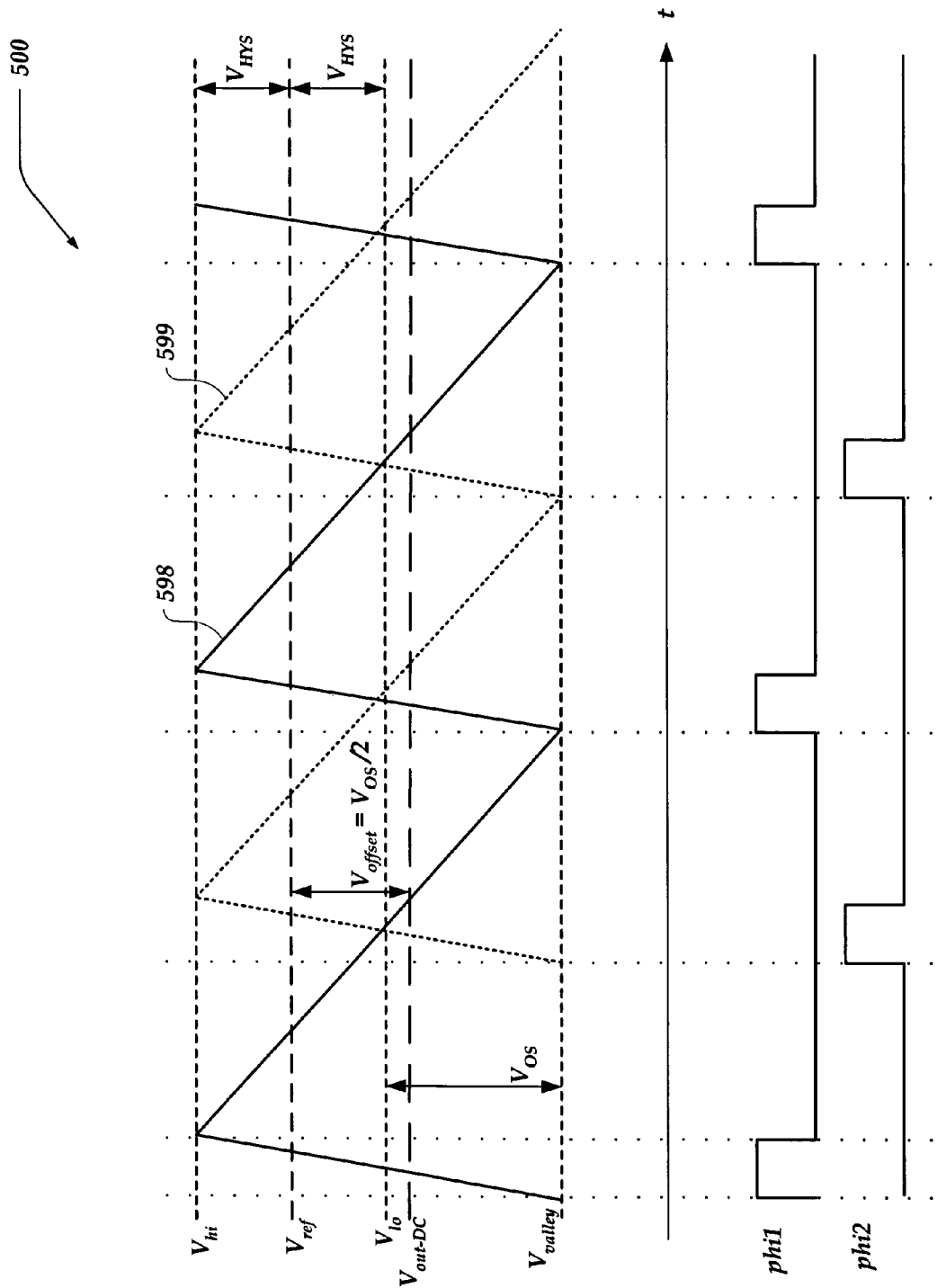
FIG. 5 illustrates a voltage diagram of various voltages involved in an operation of the hysteretic voltage regulator circuit of FIG. 1.

FIG. 5 illustrates voltage diagram 500 of various voltages involved in an operation of a multiplexed hysteretic voltage regulator circuit such as hysteretic voltage regulator circuit 100 of FIG. 1.

Voltage diagram 500 illustrates waveforms for high and low limit voltages of a hysteresis band V$_{hi}$ and V$_{lo}$, reference voltage V$_{ref}$, a DC component of output voltage V$_{OUT\_DC}$, and a lowest voltage V$_{valley}$ in the hysteretic regulator circuit. Waveform 598 represents multiplexed voltage in a first phase V$_{SEN1}$. Waveform 599 represents multiplexed voltage in a second phase V$_{SEN2}$. Overshoot voltage V$_{OS}$, offset voltage V$_{offset}$, and hysteresis voltage V$_{HYS}$ are also shown. Voltage diagram 500 further depicts pulse width modulation signals phi1 and phi2 that trigger a ramping of the controlled voltage in each phase of the multiplexed hysteretic control.

As described above, a hysteretic voltage regulator circuit operates employing a hysteresis band with high and low limit voltages V$_{hi}$ and V$_{lo}$. If a regulated output voltage V$_{OUT}$ exceeds the high limit, the circuit decides to turn of the switch, limiting V$_{OUT}$ as indicated by phi1 changing to a high level. An opposite control is employed when V$_{OUT}$ reaches the lower limit V$_{lo}$. However, in a multiplexed hysteretic regulator circuit, one voltage may be descending while a second voltage is ascending, resulting in a shift of V$_{OUT}$. The offset voltage V$_{offset}$ causing the shift is substantially equal to one half of the overshoot voltage V$_{OS}$. The overshoot voltage V$_{OS}$ is substantially equal to a difference between the lower limit voltage V$_{lo}$ and a lowest voltage of the regulator circuit V$_{valley}$. The lowest voltage V$_{valley}$ is determined as a value of transient V$_{OUT}$ as it reaches its lowest descending point. Accordingly, an embodiment of the present invention adds a correction voltage that is equal to $$\frac{1}{2}(V_{lo} - V_{valley})$$

substantially reducing the offset error component of V$_{OUT}$.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for voltage regulation, comprising:
    a timing logic circuit that is arranged to provide a plurality of timing control voltages in response to a first digital voltage and a second digital voltage, wherein the first digital voltage and the second digital voltage are associated with a first phase and a second phase of multiplexing;
    a sample-and-hold circuit that is arranged to track a first multiplexed voltage and a second multiplexed voltage based on the plurality of timing control signals, and is further arranged to provide a correction voltage in response to the tracked multiplexed voltages, wherein the first multiplexed voltage and the second multiplexed voltage are phase-shifted; and
    a multiplexed hysteretic control circuit that is arranged to provide a regulated output voltage in response to an input voltage and the correction voltage such that an offset of the output voltage that is caused by the multiplexing is corrected.

2. The circuit of claim 1, wherein the timing logic circuit comprises:
    a first timing control module that is arranged to provide a first timing control voltage phi_a and a second timing control voltage phi_b in response to the first digital voltage phi1 and the second digital voltage phi2, wherein phi_a and phi_b are employed in controlling a sample-timing and a hold-timing of a first sample-and-hold module;
    a second timing control module that is arranged to provide a third timing control voltage t_a, and a fourth timing control voltage t_c in response to phi1, phi_a, and phi_b, wherein another sample-timing and another hold-timing of a second sample-and-hold module is controlled based, in part, on t_a and t_c; and
    a third timing control module that is arranged to provide a fifth timing control voltage t_b, and a sixth timing control voltage t_d in response to phi2, phi_a, and phi_b, wherein t_a, t_b, t_c, and t_d are employed to control a further sample-timing and a further hold-timing of a third sample-and-hold module.

3. The circuit of claim 2, wherein:
    the first timing control module comprises:
        a first flip flop that is arranged to receive phi1, and to control two cascaded transistors that are arranged to provide phi_b; and
        a second flip flop that is arranged to receive phi2, and to control two other cascaded transistors that are arranged to provide phi_a;
    the second timing control module comprises:
        a first AND operator that is arranged to receive phi1 and phi_a, and to provide an AND'ed output voltage to a third flip flop that is arranged to control two cascaded transistors that are arranged to provide t_a; and
        a second AND operator that is arranged to receive phi1 and phi_b, and to provide an AND'ed output voltage to a fourth flip flop that is arranged to control two other cascaded transistors that are arranged to provide t_c; and
    the third timing control module comprises:
        a third AND operator that is arranged to receive phi2 and phi_a, and to provide an AND'ed output voltage to a fifth flip flop that is arranged to control two cascaded transistors that are arranged to provide t_b; and
        a fourth AND operator that is arranged to receive phi2 and phi_b, and to provide an AND'ed output voltage to a sixth flip flop that is arranged to control two other cascaded transistors that are arranged to provide t_d.

4. The circuit of claim 2, wherein the sample-and-hold circuit comprises:
    the first sample-and-hold module arranged to sample the first multiplexed voltage and the second multiplexed voltage based on phi_a and phi_b, and to provide a low limit voltage $V_{lo}$ for the hysteretic control circuit;

the second sample-and-hold module arranged to sample the second multiplexed voltage based on t_a, t_b, t_c, and t_d, and to provide a first lowest voltage; and the third sample-and-hold module arranged to sample the first multiplexed voltage based on t_a, t_b, t_c, and t_d, and to provide a second lowest voltage, wherein a combination of the first lowest voltage and the second lowest voltage provides a lowest voltage $V_{valley}$ of the hysteretic control circuit.

5. The circuit of claim 4, further comprising:

a differential amplifier that is arranged to receive $V_{lo}$ and $V_{valley}$, and to provide a correction voltage $V_{COR}$ in response to $V_{lo}$ and $V_{valley}$.

6. The circuit of claim 5, wherein the differential amplifier is arranged to provide $V_{COR}$ such that $V_{COR}=(V_{lo}-V_{valley})/2$.

7. The circuit of claim 4, wherein the first sample-and-hold module comprises:

one pair of sampling transistors that are activated based on phi_a and phi_b;

one pair of holding capacitors that are arranged to hold the sampled voltage; and one pair of forwarding transistors that are arranged to provide the sampled voltage based on phi_b and phi_a.

8. The circuit of claim 4, wherein the second sample-and-hold module comprises:

one pair of sampling transistors that are activated based on t_a and t_b;

one pair of holding capacitors that are arranged to hold the sampled voltage; and one pair of forwarding transistors that are arranged to provide the sampled voltage based on t_c and t_d.

9. The circuit of claim 4, wherein the third sample-and-hold module comprises:

one pair of sampling transistors that are activated based on t_b and t_c;

one pair of holding capacitors that are arranged to hold the sampled voltage; and one pair of forwarding transistors that are arranged to provide the sampled voltage based on t_d and t_a.

10. The circuit of claim 2, wherein the hysteretic control circuit comprises:

a hysteretic feedback circuit that is arranged to provide a hysteretic feedback voltage in response to a reference voltage and the output voltage;

a comparator that is arranged to provide a corrected voltage in response to the correction voltage, the hysteretic feedback voltage, and at least one of the first multiplexed voltage and the second multiplexed voltage;

a frequency divider that is arranged to provide a first input voltage to a first dual phase driver and a second input voltage to a second dual phase driver in response to the corrected voltage;

the first dual phase driver that is arranged to provide the first multiplexed voltage in response to the first input voltage; and the second dual phase driver that is arranged to provide the second multiplexed voltage in response to the second input voltage.

11. The circuit of claim 10, wherein the hysteretic control circuit further comprises:

an RC filter circuit that is arranged to receive the first multiplexed voltage and the second multiplexed voltage, and to provide the regulated output voltage.

12. The circuit of claim 10, wherein the first dual phase driver and the second dual phase driver each include a serially coupled inductor at their output stage.

13. The circuit of claim 10, wherein the comparator is arranged to add the correction voltage to the reference voltage from the hysteretic feedback circuit.

14. The circuit of claim 10, wherein the comparator is arranged to add the correction voltage to the output voltage from the hysteretic feedback circuit.

15. The circuit of claim 1, wherein transistors of the hysteretic voltage regulator, the timing logic circuit, and the sample and hold block include at least one of a PMOS FET and an NMOS FET.

16. A method for correcting an offset caused by multiplexing in a hysteretic regulation circuit, the method comprising:

sampling a first multiplexed voltage based on a first timing control voltage and a second timing control voltage;

sampling a second multiplexed voltage based on a first timing control voltage and a second timing control voltage in reverse order;

determining a low hysteretic limit voltage based on sampling the first multiplexed voltage and the second multiplexed voltage;

sampling the first multiplexed voltage based on a plurality of other timing control voltages;

sampling the second multiplexed voltage based on a plurality of the other timing control voltages;

determining a lowest voltage based on sampling the first multiplexed voltage and the second multiplexed voltage based on the other timing control voltages; and determining a correction voltage based on the low hysteretic limit voltage and the lowest voltage.

17. The method of claim 16, further comprising combining the correction voltage with a reference voltage such that an offset component of an output voltage caused by multiplexing is substantially reduced.

18. The method of claim 16, further comprising combining the correction voltage with an output voltage such that an offset component of the output voltage caused by multiplexing is substantially reduced.

19. The method of claim 16, wherein determining the correction voltage comprises:

subtracting the lowest voltage from the low hysteretic limit voltage and dividing a resulting voltage by two.

20. A multiplexed hysteretic voltage regulation circuit, comprising:

a sample-and-hold circuit that is arranged to track a first phase and a second phase of a hysteretic voltage and to provide a correction voltage in response to a plurality of timing control voltages that are associated with the first phase and the second phase; and a hysteretic control circuit that is arranged to provide a regulated output voltage based, in part, of the correction voltage, wherein the correction voltage is added to at least one of a reference voltage and the output voltage such that a DC offset of the output voltage that is caused by the multiplexing is corrected.

* * * * *

UNITED STATES PATENT AND TRADEMARK OFFICE
CERTIFICATE OF CORRECTION

PATENT NO. : 7,098,728 B1
APPLICATION NO. : 10/915816
DATED : August 29, 2006
INVENTOR(S) : Tawen Mei et al.

It is certified that error appears in the above-identified patent and that said Letters Patent is hereby corrected as shown below:

Title Page Item (56) (Other Publications), Line 1, Delete "Multphase" and insert -- Multiphase --.

Column 5, Line 57, Delete "V1," and insert -- $V_{lo}$ --.

Column 6, line 35(Approx.), Delete " $V'_{COR} = \frac{1}{2}(V_{ref} + V_{OUT} + V_{lo} - V_{valley})$." and insert -- $V_{COR}' = \frac{1}{2}(V_{ref} + V_{OUT} + V_{lo} - V_{valley})$ --

Signed and Sealed this

Twenty-sixth Day of December, 2006

JON W. DUDAS
*Director of the United States Patent and Trademark Office*